(12) United States Patent
Kim (10) Patent No.: US 8,327,971 B2
(45) Date of Patent: Dec. 11, 2012

(54) REDUCER OF ELECTRIC POWER STEERING APPARATUS

(75) Inventor: Tae Sik Kim, Wonju-si (KR)

(73) Assignee: Mando Corporation, Gyeonggi-do (KR)

( * ) Notice: Subject to any disclaimer, the term of this patent is extended or adjusted under 35 U.S.C. 154(b) by 128 days.

(21) Appl. No.: 12/888,874

(22) Filed: Sep. 23, 2010

(65) Prior Publication Data

US 2011/0067946 A1    Mar. 24, 2011

(30) Foreign Application Priority Data

Sep. 24, 2009  (KR) .................. 10-2009-0090605
Sep. 8, 2010   (KR) .................. 10-2010-0087758

(51) Int. Cl.
*B62D 5/04* (2006.01)
(52) U.S. Cl. ........................................ 180/444
(58) Field of Classification Search .......... None
See application file for complete search history.

(56) References Cited

U.S. PATENT DOCUMENTS

| | | | |
|---|---|---|---|
| 6,761,244 B2 * | 7/2004 | Sano et al. | 180/444 |
| 6,769,507 B2 * | 8/2004 | Murakami et al. | 180/444 |
| 7,048,088 B2 * | 5/2006 | Bernhard et al. | 180/444 |
| 7,401,678 B2 * | 7/2008 | Yuasa et al. | 180/444 |
| 7,455,149 B2 * | 11/2008 | Segawa et al. | 180/444 |
| 2008/0006472 A1 * | 1/2008 | Song et al. | 180/444 |
| 2009/0255751 A1 * | 10/2009 | Kondo et al. | 180/444 |
| 2009/0294205 A1 * | 12/2009 | Wilkes | 180/444 |

* cited by examiner

*Primary Examiner* — Tony Winner
(74) *Attorney, Agent, or Firm* — McDermott Will & Emery LLP (57) ABSTRACT

A reducer of an electric power steering apparatus, which can prevent the steering feel for a driver, and the performance from being reduced by minimizing an increase in the torque, caused by moisture absorption of a worm wheel, and a size change due to the moisture absorption, and also can eliminate the playing caused by wearing of a worm and the worm wheel, and inhibit the occurring of a rattle noise caused by a backlash and a reversely input load.

15 Claims, 6 Drawing Sheets

REDUCER OF ELECTRIC POWER STEERING APPARATUS

BACKGROUND OF THE INVENTION

1. Field of the Invention

The present invention relates to a reducer of an electric power steering apparatus. More particularly, the present invention relates to a reducer of an electric power steering apparatus, which can exactly assist a driver's operation of a steering wheel by minimizing an increase in the torque, caused by moisture absorption of a worm wheel, and a size change due to the moisture absorption, and also can eliminate the playing caused by wearing of a worm and the worm wheel, and inhibit the occurring of a rattle noise caused by a backlash and a reversely input load.

2. Description of the Prior Art

Recent research development of a technology on a steering apparatus provided in a vehicle shows a tendency toward achieving a driver's convenience (such as stability of steering state, and soft and comfortable steering feeling) as well as safety. According to such a development tendency, in order to improve the steering feeling of a driver, various power steering apparatuses such as a hydraulic power steering apparatus or an electric power steering apparatus have been developed. Compared to a hydraulic power steering apparatus, an electric power steering apparatus is light-weight, requires low energy consumption, and improves the fuel efficiency of a vehicle. Thus, due to such advantages, the use of the electric power steering apparatus shows a tendency to be increased.

In general, the electric power steering apparatus assists a steering torque of a driver by driving a motor in an electronic control device according to a vehicle's driving conditions sensed by a wheel speed sensor, a torque sensor, etc. while providing a light and comfortable steering state during low-speed driving, providing a heavy and stable steering state during high-speed driving, and allowing rapid steering operation to be performed in a state of accidental emergency so as to cope with the situation, which provides steering performance allowing the driver's optimum steering feeling to be maintained.

Figure 1:
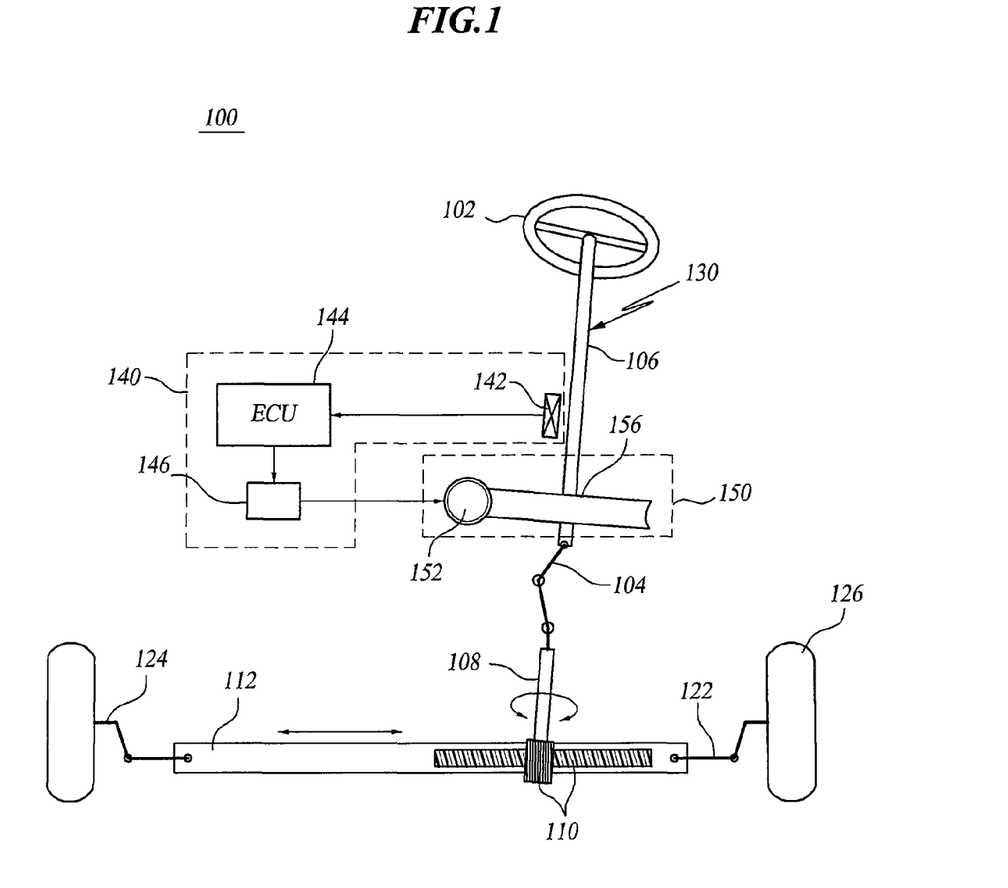
FIG. 1 is a configuration view illustrating a conventional electric power steering apparatus.

FIG. 1 is a configuration view illustrating a conventional electric power steering apparatus. As shown in FIG. 1, an electric power steering apparatus 100 is configured to include a steering system 130 extending from a steering wheel 102 to both-side wheels 126, and an auxiliary power mechanism 140 for supplying auxiliary steering power to the steering system 130.

The steering system 130 includes a steering shaft 106 whose one side is connected to the steering wheel 102 and rotates together with the steering wheel 102, and the other side is connected to a pinion shaft 108 via a couple of universal joints 104. Also, the pinion shaft 108 is connected to a rack bar 112 through a rack-pinion mechanism 110, and both ends of the rack bar 112 are connected to the wheels 126 of a vehicle through a tie rod 122 and a knuckle arm 124.

The auxiliary power mechanism 140 includes a torque sensor 142, an electronic control unit 144, a motor 146, and a reducer 150. The torque sensor 142 senses a torque applied to the steering wheel 102 by a driver, and outputs an electrical signal in proportion to the sensed torque. The electronic control unit 144 generates a control signal based on the electrical signal transferred from the torque sensor 142. The motor 146 generates auxiliary steering power based on the control signal transferred from the electronic control unit 144. The reducer 150 is provided with a worm 152 and a worm wheel 156 so as to transfer the auxiliary steering power generated by the motor 146 to the steering shaft 106.

Accordingly, the electric power steering apparatus is configured in such a manner that the torque generated by the rotation of the steering wheel 102 is transferred to the rack bar 112 via the rack-pinion mechanism 110, and the auxiliary steering power generated by the motor 146 according to the generated torque is transferred to the rack bar 112.

In other words, the torque generated by the rotation of the steering wheel 102, together with the auxiliary steering power generated by the motor 146, allows the rack bar 112 to move in the axial direction.

Figure 2:
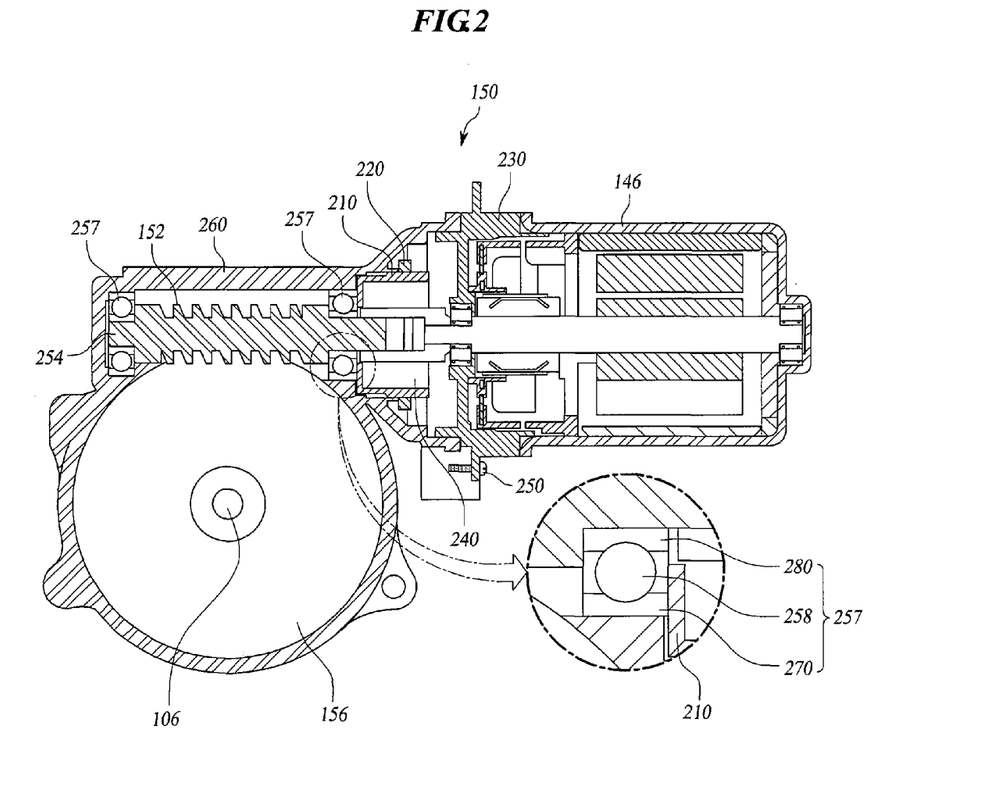
FIG. 2 is a cross-sectional view illustrating a reducer of a conventional electric power steering apparatus.

FIG. 2 is a cross-sectional view illustrating a reducer of a conventional electric power steering apparatus. As shown in FIG. 2, in the reducer 150, a worm shaft 254 formed with the worm 152 is provided, and both ends of the worm shaft 254 are provided with worm shaft bearings 257, respectively, to support the worm shaft 254. Also, in order to prevent the worm shaft bearing 257 from playing in the axial direction of the worm shaft 254, a plug bolt 210 is fastened between a damping coupler 240 and the worm shaft bearing 257, and the plug bolt 210 is fixed by a plug nut 220.

The worm shaft 254 is configured to be connected to the motor 146 via the damping coupler 240 and to be rotated by the driving of the motor 146.

Then, at one side of the external diameter of the worm 152, the worm wheel 156 is provided in such a manner that it can be tooth-engaged with the worm 152 formed on the worm shaft 254. The worm wheel 156 is configured to be mounted to the steering shaft 106, in which to the steering shaft 106, the torque of the steering wheel 102 operated by the driver is transferred, while the worm shaft 254's auxiliary steering power caused by the driving of the motor 146 is transferred to the steering shaft 106.

A gear housing 260 houses the worm 152, the worm wheel 156, and the like, and is provided with, at its one side, the motor 146 for providing the driving force to the worm shaft 254. The gear housing 260 and the motor 146 are combined with each other through a bolt 250 by a motor cover 230.

The worm shaft bearing 257 has a ball 258 combined with an inner wheel 280 and an outer wheel 270 thereof so as to support the rotation of the worm shaft 254 connected to the motor 150 at the end of the gear housing 260.

The reducer of the electric power steering apparatus, as configured above, controls the driving of a motor by an electronic control unit provided in a vehicle according to driving conditions of the vehicle, and transfers a worm shaft's auxiliary steering power caused by the driving of the motor, together with a driver-driven steering wheel's torque, to a steering shaft. This makes it possible to keep the driver's steering state soft and stable.

However, the reducer of the conventional electric power steering apparatus has a problem in that the progress in the wearing of the worm and the worm wheel rotated by the driving of the motor causes playing due to the wear, and a rattle noise due to the backlash. Furthermore, there is a problem in that the rattle noise more significantly occurs by a load reversely input from wheels during driving on a rough road.

Also, the worm is made of a metal such as steel while a part (outer circumferential portion) or the whole of the worm wheel is made of a plastic material to cope with a friction resistance with the worm. Thus, when a vehicle is driven in a region of high temperature and humidity, the worm wheel made of the plastic material is expanded by absorption of moisture, thereby changing the size of the worm wheel. This increases the torque, making a driver's steering feeling heavy, which reduces the performance.

SUMMARY OF THE INVENTION

Accordingly, the present invention has been made to solve the above-mentioned problems occurring in the prior art, and the present invention provides a reducer of an electric power steering apparatus, which can prevent the steering feeling of a driver, and the performance from being reduced by minimizing an increase in the torque, caused by moisture absorption of a worm wheel, and a size change due to the moisture absorption, and also can eliminate the playing caused by wearing of a worm and the worm wheel, and inhibit the occurring of a rattle noise caused by a backlash and a reversely input load.

In accordance with an aspect of the present invention, there is provided a reducer of an electric power steering apparatus, the reducer including: a worm shaft bearing supporting an opposite side end of a worm shaft's motor shaft coupling portion, the worm shaft being formed with a worm tooth-engaged with a worm wheel; a bearing holder coupled with the worm shaft bearing while wrapping an outer wheel of the worm shaft bearing; an elastic ring intervened between the worm shaft bearing and the bearing holder; an elastic support provided in an inner circumferential surface of a gear housing in an opposite direction of the worm wheel so as to support an end portion of the worm shaft in a direction of the worm wheel; and a supporting member positioned between an outer circumferential surface of the bearing holder and the inner circumferential surface of the gear housing so as to support the end portion of the worm shaft.

In accordance with another aspect of the present invention, there is provided a reducer of an electric power steering apparatus, the reducer including: a worm shaft bearing supporting an opposite side end of a worm shaft's motor shaft coupling portion, the worm shaft being formed with a worm tooth-engaged with a worm wheel; a bearing holder coupled with the worm shaft bearing while wrapping an outer wheel of the worm shaft bearing; a first elastic support and a second elastic support intervened between the worm shaft bearing and the bearing holder, which are oppositely positioned; a third elastic support provided in an inner circumferential surface of a gear housing in an opposite direction of the worm wheel so as to support an end portion of the worm shaft in a direction of the worm wheel; and a supporting member positioned between an outer circumferential surface of the bearing holder and the inner circumferential surface of the gear housing so as to support the end portion of the worm shaft.

In accordance with another aspect of the present invention, there is provided a reducer of an electric power steering apparatus, the reducer including: a worm shaft bearing supporting an opposite side end of a worm shaft's motor shaft coupling portion, the worm shaft being formed with a worm tooth-engaged with a worm wheel; a bearing holder coupled with the worm shaft bearing while wrapping an outer wheel of the worm shaft bearing; an elastic support provided in an inner circumferential surface of a gear housing in an opposite direction of the worm wheel so as to support an end portion of the worm shaft in a direction of the worm wheel; and a supporting member positioned between an outer circumferential surface of the bearing holder and the inner circumferential surface of the gear housing so as to support the end portion of the worm shaft, wherein the supporting member is made of a plastic material having the amount of moisture-absorption expansion lower than or equal to that of a plastic material used for the worm wheel.

The reducer of the electric power steering apparatus, according to the present invention, can prevent the steering feeling of a driver, and the performance from being reduced by minimizing an increase in the torque, caused by moisture absorption of a worm wheel, and a size change due to the moisture absorption, and also can eliminate the playing caused by wearing of a worm and the worm wheel, and inhibit the occurring of a rattle noise caused by a backlash and a reversely input load.

BRIEF DESCRIPTION OF THE DRAWINGS

The above and other objects, features and advantages of the present invention will be more apparent from the following detailed description taken in conjunction with the accompanying drawings, in which:

FIG. 3a is a cross-sectional view illustrating a part of a reducer of an electric power steering apparatus, according to a first exemplary embodiment of the present invention, and FIG. 3b is a perspective view illustrating a supporting member shown in FIG. 3a;

FIG. 4a is a cross-sectional view illustrating a part of a reducer of an electric power steering apparatus, as another example, according to a first exemplary embodiment of the present invention, and FIG. 4b is a perspective view illustrating a supporting member shown in FIG. 4a;

FIG. 5a is a cross-sectional view illustrating a part of a reducer of an electric power steering apparatus, according to a second exemplary embodiment of the present invention, and FIG. 5b is a perspective view illustrating a supporting member shown in FIG. 5a; and FIG. 6a is a cross-sectional view illustrating a part of a reducer of an electric power steering apparatus, as another example, according to a second exemplary embodiment of the present invention, and FIG. 6b is a perspective view illustrating a supporting member shown in FIG. 6a.

DETAILED DESCRIPTION OF THE EXEMPLARY EMBODIMENTS

Hereinafter, exemplary embodiments of the present invention will be described with reference to the accompanying drawings. In reference numerals given to components of respective drawings, it should be noticed that same components are designated by the same reference numerals as far as possible although they are illustrated in different drawings. Further, in the following description of the present invention, a detailed description of known functions and configurations incorporated herein will be omitted when it may make the subject matter of the present invention rather unclear.

In addition, terms, such as first, second, A, B, (a), (b) or the like may be used herein when describing components of the present invention. Each of these terminologies is not used to define an essence, order or sequence of a corresponding component but used merely to distinguish the corresponding component from other component(s). It should be noted that if it is described in the specification that one component is "connected," "coupled" or "joined" to another component, a third component may be "connected," "coupled," and "joined" between the first and second components, although the first component may be directly connected, assembled or joined to the second component.

Figure 3:
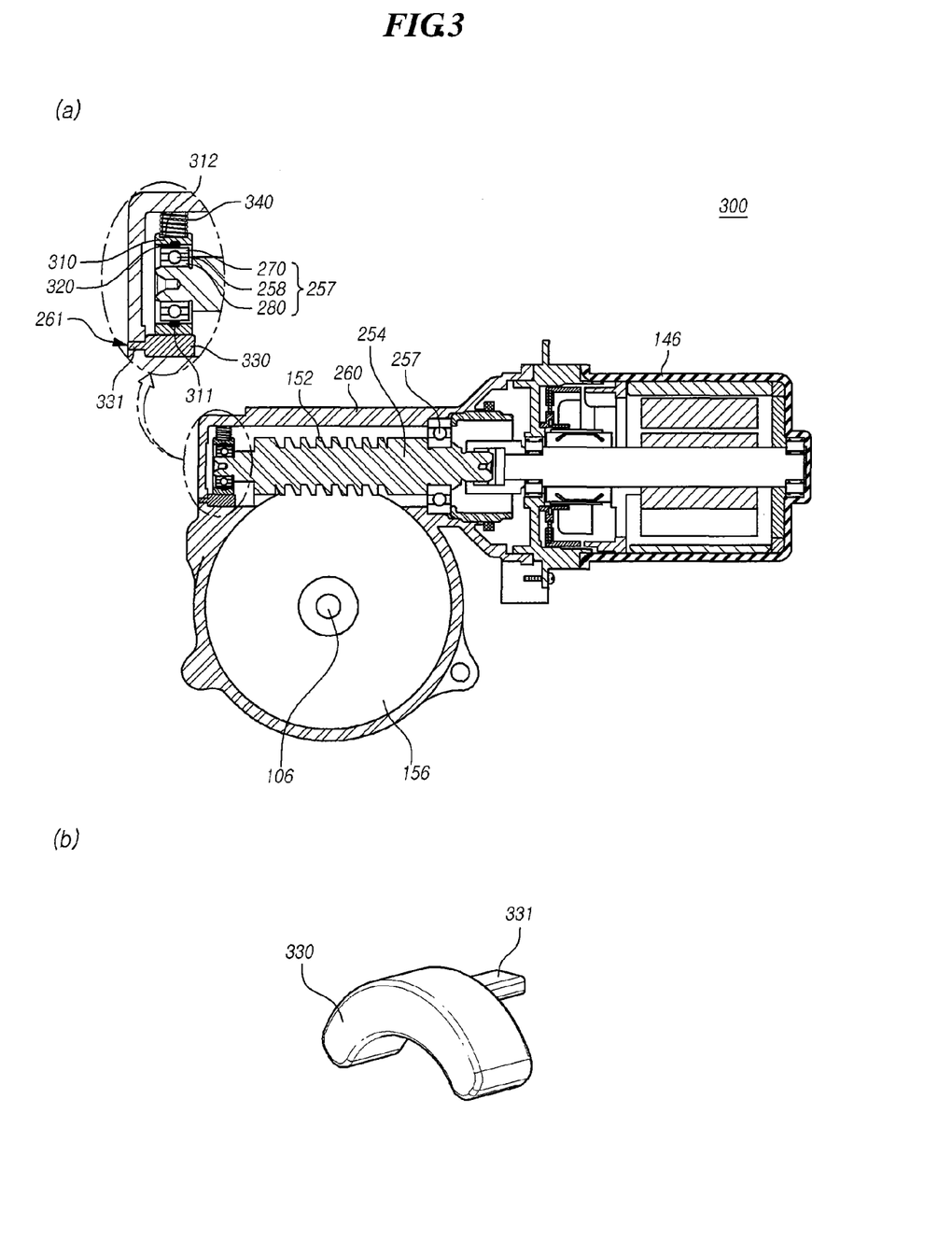
Figure 4:
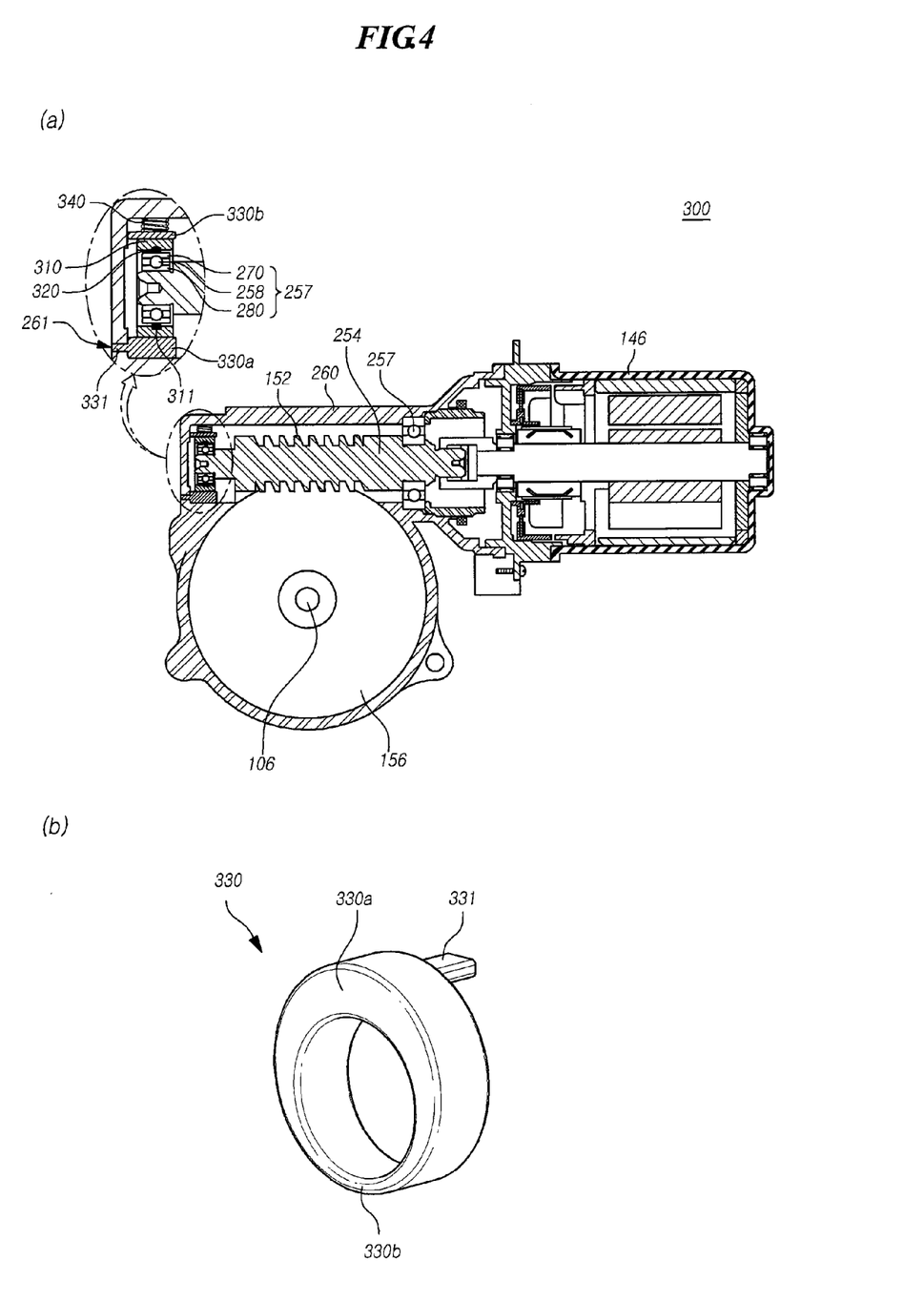

FIGS. 3 and 4 show a part of a reducer of an electric power steering apparatus, according to a first exemplary embodiment of the present invention. As shown in the drawings, a reducer 300 for the electric power steering apparatus, according to a first exemplary embodiment of the present invention, includes: a worm shaft bearing 257 supporting the other side end of a worm shaft 254's motor shaft coupling portion, the worm shaft 254 being formed with a worm 152 tooth-engaged with a worm wheel 156; a bearing holder 310 coupled with the worm shaft bearing 257 while wrapping an outer wheel of the worm shaft bearing 257; an elastic ring 320 intervened between the worm shaft bearing 257 and the bearing holder 310; an elastic support 340 provided in the inner circumferential surface of a gear housing 260 in the opposite direction of the worm wheel so as to support the end portion of the worm shaft 254 in the direction of the worm wheel; and a supporting member 330 positioned between the outer circumferential surface of the bearing holder 310 and the inner circumferential surface of the gear housing 260 so as to support the end portion of the worm shaft 254.

The reducer 300 for the electric power steering apparatus, according to a first exemplary embodiment of the present invention, has a structure in which the elastic support 340 supports the worm shaft 254 in the direction of the worm wheel 156 within the gear housing 260, and thus can eliminate a backlash caused by rotation-wearing of the worm 152 and the worm wheel 156, and inhibit a rattle noise caused by a reversely input load.

Also, since the elastic support 340 elastically supports the end portion of the worm shaft 254 within the gear housing 260, the end portion of the worm shaft 254 can move in the opposite direction of the worm wheel even if the worm wheel 156 is expanded by moisture absorption. Thus, it is possible to minimize an increase of torque caused by a change in the size.

In the reducer 300, the worm 152 and the worm wheel 156 interlock by a driving force of a motor 146, and thereby rotate a steering shaft 106, which assists a steering force of a driver. Both ends of the worm shaft 254 interlocking with the shaft of the motor 146 during the driving of the motor 146 are fastened with the worm shaft bearings 257 so as to support the rotation of the worm shaft 254. Meanwhile, the worm wheel 156 and the worm 152 interlocking with the steering shaft 106 are embedded in a gear housing 260. Herein, the worm 152 is made of a metal such as steel while a part (outer circumferential portion) or the whole of the worm wheel 156 is made of a plastic material such as acetal (POM) or polyamide to cope with a friction resistance with the worm 152.

Meanwhile, in the opposite direction of the motor 146, the worm shaft bearing 257 having a ball 258 combined with an inner wheel 280 and an outer wheel 270 thereof supports the rotation of the worm shaft 254 at the end portion of the gear housing 260, in which in the outer wheel 270 of the worm shaft bearing 257, the bearing holder 310 is inserted, and between the outer wheel 270 of the worm shaft bearing 257 and the inside of the bearing holder 310, the elastic ring 320 is intervened.

When the rotation-wearing of the worm shaft 254 is progressed, a noise and a backlash occur by playing caused by the wearing of the worm 152 and the worm wheel 156. In order to compensate for such playing, the elastic support 340 which eliminates the playing by pushing the end portion of the worm shaft 254 toward the worm wheel 156 is mounted at the other side end of the worm shaft 254's motor shaft coupling portion.

The bearing holder 310 is made of steel or a plastic material with a low moisture-absorption expansion, and an end portion of the worm shaft 254 passes through the bearing holder 310 and is coupled with the worm shaft bearing 257. The end portion is coupled with the worm shaft bearing 257 while wrapping the outer wheel 270 of the worm shaft bearing 257. On the inner circumferential surface of the bearing holder 310, an inner circumferential groove 311 having a depth of about a radius of the elastic ring 320 is formed along the circumference, and within the inner circumferential groove 311, the elastic ring 320 is positioned. The elastic ring 320 prevents an impact noise from occurring between the bearing holder 310 and the worm shaft bearing 257.

Also, in the bearing holder 310, an insertion groove 312, in which the elastic support 340 is provided, is formed in a part of the outer circumferential surface at the opposite side of the worm wheel 156. Thus, when the elastic support 340 is assembled, the insertion groove 312 can prevent the elastic support 340 from being separated.

The elastic support 340 may be a general circular coil spring or a deformed coil spring, but the present invention is not limited thereto.

The supporting member 330 is positioned between the outer circumferential surface of the bearing holder 310 and the inner circumferential surface of the gear housing 260 so as to support the end portion of the worm shaft 254, which is made of a plastic material having a moisture-absorption expansion lower than or equal to that of a plastic material used for the worm wheel 156.

The supporting member 330, as shown in FIGS. 3 and 4, has a cross-section with a circular arc shape or an arc shape, or is ring-shaped, and is formed with a predetermined-sized projection 331 at the lateral surface thereof. The projection 331 is inserted and fixed in a fixing groove 261 formed at the gear housing 260's corresponding position.

In other words, the supporting member 330, as shown in FIG. 3, is formed in an arc shape, in which the inner circumferential surface is supported by the worm wheel-directional outer circumferential surface of the bearing holder 310, and the outer circumferential surface is supported by the inner surface of the gear housing 260, or as shown in FIG. 4, is formed in a circular shape, in which the radial width of a portion 330a supported by the worm wheel-directional outer circumferential surface of the bearing holder 310 is larger than that of a portion 330b supported by the worm wheel's opposite directional outer circumferential surface of the bearing holder 310.

Accordingly, the elastic support 340 supports the bearing holder 310, the worm shaft bearing 257, and the end portion of the worm shaft 254 toward the worm wheel 156 by an elastic force, which eliminates the backlash caused by rotation-wearing of the worm 152 and the worm wheel 156, and inhibit the rattle noise caused by a reversely input load.

Furthermore, in a case where a vehicle is driven in a region of high temperature and humidity, when the worm wheel 156 made of the plastic material is expanded by absorption of moisture and thereby its size is changed, the supporting member 330 is also expanded by absorption of moisture and pushes the bearing holder 310, the worm shaft bearing 257, and the end portion of the worm shaft 254 toward the opposite side of the worm wheel 156, thereby compressing the elastic support 340. This makes it possible to minimize an increase in the torque between the worm 152 and the worm wheel 156, thereby preventing the steering feeling of a driver, and the performance from being reduced.

Herein, in FIG. 4, the amount of the moisture-absorption expansion of the portion 330a supported by the worm wheel-directional outer circumferential surface of the bearing holder 310 is higher than that of the portion 330b supported by the worm wheel's opposite directional outer circumferential surface of the bearing holder 310. Thus, the end portion of the worm shaft 254 is supported in the opposite direction of the worm wheel 156, that is, in the same direction as the expansion of the worm wheel.

Such a supporting member 330 is made of one or more materials selected from the group including mono cast (MC) nylon, polyamide 6, polyamide 66, polyamide 46, and polyamide 12, and thus its volume is expanded by moisture absorption. This counterbalances the worm wheel's expansion caused by moisture absorption, and thereby makes the tooth-engagement of the worm and the worm wheel flexible and increases the steering feeling.

Figure 5:
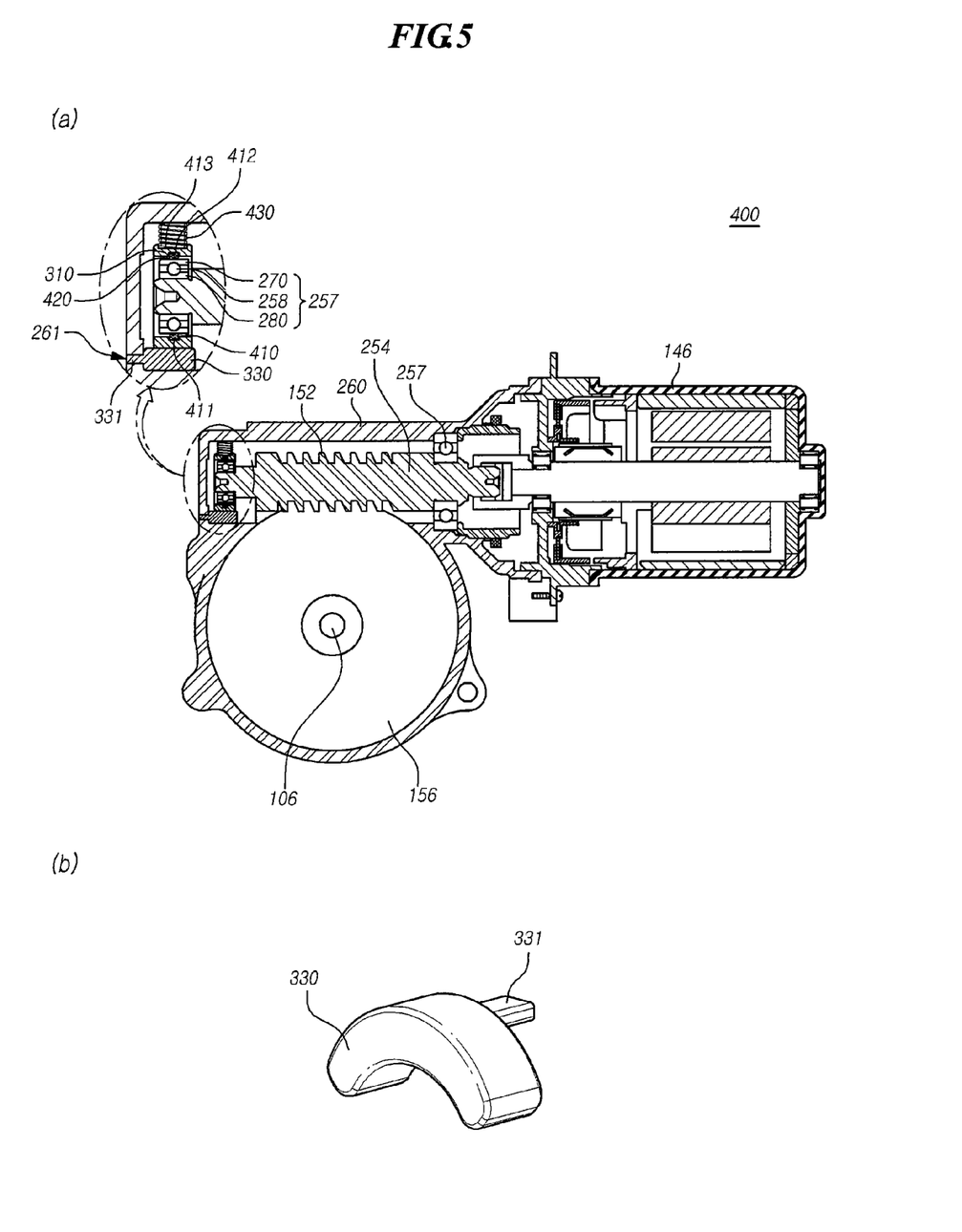
Figure 6:
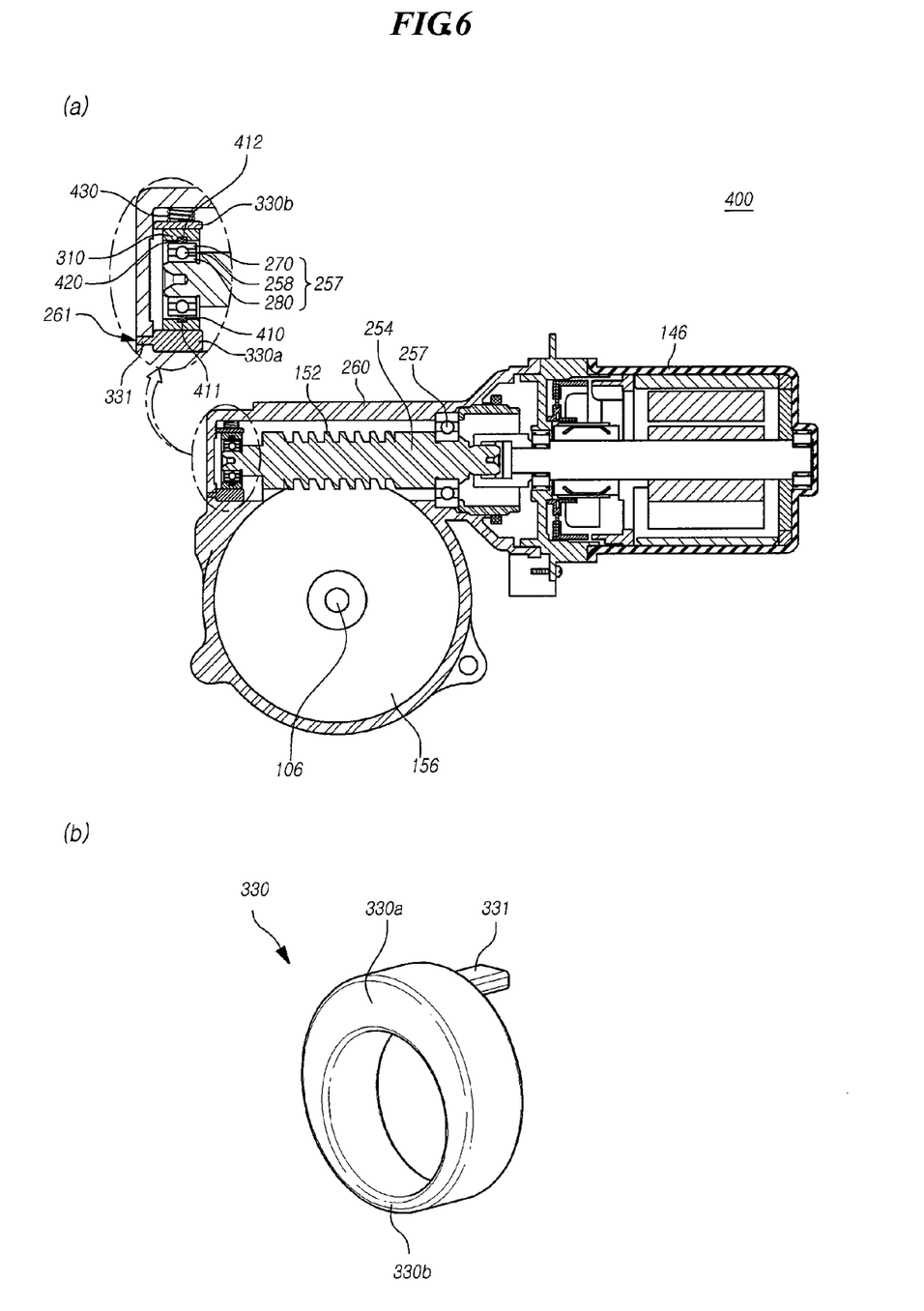

FIGS. 5 and 6 show a part of a reducer of an electric power steering apparatus, according to a second exemplary embodiment of the present invention. As shown in the drawings, a reducer 400 for the electric power steering apparatus, according to a second exemplary embodiment of the present invention, includes: a worm shaft bearing 257 supporting the other side end of a worm shaft 254's motor shaft coupling portion, the worm shaft 254 being formed with a worm 152 tooth-engaged with a worm wheel 156; a bearing holder 310 coupled with the worm shaft bearing 257 while wrapping an outer wheel of the worm shaft bearing 257; a first elastic support 410 and a second elastic support 420 intervened between the worm shaft bearing 257 and the bearing holder 310, which are oppositely positioned; a third elastic support 430 provided in the inner circumference of the gear housing 260 in the opposite direction of the worm wheel so as to support the end portion of the worm shaft 254 in the direction of the worm wheel; and a supporting member 330 positioned between the outer circumferential surface of the bearing holder 310 and the inner circumferential surface of the gear housing 260 so as to support the end portion of the worm shaft 254.

The second exemplary embodiment has the same components as those of the first exemplary embodiment as described above except that its bearing holder 310's structure is different from the first exemplary embodiment, and it further includes the first elastic support 410, and the second elastic support 420. Thus, detailed description on the same components will be omitted.

The reducer 400 for the electric power steering apparatus, according to a second exemplary embodiment of the present invention, has a structure in which the first elastic support 410, the second elastic support 420, and the third elastic support 430 support the worm shaft 254 in the direction of the worm wheel 156 within the gear housing 260, and thus can eliminate a backlash caused by rotation-wearing of the worm 152 and the worm wheel 156, and inhibit a rattle noise caused by a reversely input load.

Also, since the first elastic support 410, the second elastic support 420, and the third elastic support 430 elastically support the end portion of the worm shaft 254 within the gear housing 260, the end portion of the worm shaft 254 can move in the opposite direction of the worm wheel even if the worm wheel 156 is expanded by moisture absorption. Thus, it is possible to minimize an increase of torque caused by a change in the size.

The bearing holder 310 is made of steel or a plastic material with a low moisture-absorption expansion, and an end portion of the worm shaft 254 passes through the bearing holder 310 and is coupled with the worm shaft bearing 257.

The bearing holder 310 is coupled with the worm shaft bearing 257 while wrapping the outer wheel 270 of the worm shaft bearing 257. In a part of the inner circumferential surface at the opposite side of the worm wheel 156, and in a part of the inner circumferential surface of the worm wheel 156 side, insertion grooves 411 and 412, in which the first elastic support 410 and the second elastic support 420 are provided respectively, are formed. Within the insertion grooves 411 and 412, the first elastic support 410 and the second elastic support 420 are positioned. The first elastic support 410 and the second elastic support 420 damp shaking reversely input from wheels to the reducer, and thereby inhibit a change in the torque and occurring of a noise, caused by the shaking.

Also, in the bearing holder 310, an insertion groove 413, in which the third elastic support 430 is provided, is formed in a part of the outer circumferential surface at the opposite side of the worm wheel 156. Thus, when the third elastic support 430 is assembled, the insertion groove 413 can prevent the third elastic support 430 from being separated.

The elastic supports 410, 420, and 430 may be general circular coil springs or deformed coil springs, but the present invention is not limited thereto.

Accordingly, the elastic supports 410, 420, and 430 support the bearing holder 310, the worm shaft bearing 257, and the end portion of the worm shaft 254 toward the worm wheel 156 by an elastic force, which eliminates the backlash caused by rotation-wearing of the worm 152 and the worm wheel 156, and inhibit the rattle noise caused by a reversely input load.

Furthermore, in a case where a vehicle is driven in a region of high temperature and humidity, when the worm wheel 156 made of the plastic material is expanded by absorption of moisture and thereby its size is changed, the supporting member 330 is also expanded by absorption of moisture and pushes the bearing holder 310, the worm shaft bearing 257, and the end portion of the worm shaft 254 toward the opposite side of the worm wheel 156, thereby compressing the elastic supports 410, 420, and 430.

The supporting member 330 is made of a plastic material having a moisture-absorption expansion lower than or equal to that of a plastic material used for the worm wheel 156. Also, the supporting member 330 has, as shown in FIG. 5, a cross-section with a circular arc shape or an arc shape, or is, as shown in FIG. 6, ring-shaped, and is formed with a predetermined-sized projection 331 at the lateral surface thereof. The projection 331 is inserted and fixed in a fixing groove 261 formed at the gear housing 260's corresponding position.

Accordingly, the elastic support 340 supports the bearing holder 310, the worm shaft bearing 257, and the end portion of the worm shaft 254 toward the worm wheel 156 by an elastic force, and the supporting member 330's volume is expanded by absorption of moisture. This counterbalances the worm wheel 156's expansion caused by moisture absorption, and thereby makes the tooth-engagement of the worm and the worm wheel flexible and increases the steering feeling. Furthermore, this eliminates the backlash caused by rotation-wearing of the worm 152 and the worm wheel 156, and inhibits the rattle noise caused by a reversely input load.

In the reducer of an electric power steering apparatus, with the above described structure, according to the present invention, it is possible to minimize an increase in the torque, caused by moisture absorption of a worm wheel, and size change due to the moisture absorption, thereby preventing the steering feeling of a driver, and the performance from being reduced. Furthermore, it is possible to eliminate the playing caused by wearing of the worm and the worm wheel, and to inhibit the occurring of a rattle noise caused by a backlash and a reversely input load.

Even though it was described above that all of the components of an embodiment of the present invention are coupled as a single unit or coupled and operated as a single unit, the present invention is not limited to such an embodiment. That is, within the purpose of the present invention, all of the components may be selectively coupled and operated as one or more units.

In addition, since terms, such as "comprising," "including," and "having" mean that one or more corresponding components may exist unless they are specifically described to the contrary, it shall be construed that one or more other components can be included. All of the terminologies containing one or more technical or scientific terminologies have the same meanings that persons skilled in the art understand ordinarily unless they are defined otherwise. A term ordinarily used like that defined by a dictionary shall be construed that it has a meaning equal to that in the context of a related description, and shall not be construed in an ideal or excessively formal meaning unless it is clearly defined in the present specification.

Although exemplary embodiments of the present invention have been described for illustrative purposes, those skilled in the art will appreciate that various modifications, additions and substitutions are possible, without departing from the scope and spirit of the invention as disclosed in the accompanying claims. Therefore, the embodiment disclosed in the present invention is intended to illustrate the scope of the technical idea of the present invention, and the scope of the present invention is not limited by the embodiment. The scope of the present invention shall be construed on the basis of the accompanying claims, and it shall be construed that all of the technical ideas included within the scope equivalent to the claims belong to the present invention.

What is claimed is:

1. A reducer of an electric power steering apparatus, the reducer comprising:
    a worm shaft bearing supporting an end of a worm shaft opposite to a motor shaft coupling portion end of the worm shaft, the worm shaft being formed with a worm tooth-engaged with a worm wheel;
    a bearing holder coupled with the worm shaft bearing while wrapping an outer wheel of the worm shaft bearing;
    an elastic ring intervened between the worm shaft bearing and the bearing holder;
    an elastic support provided on an inner circumferential surface of a gear housing so as to support an end portion of the worm shaft; and
    a supporting member positioned between an outer circumferential surface of the bearing holder and the inner circumferential surface of the gear housing so as to support the end portion of the worm shaft.

2. The reducer of the electric power steering apparatus as claimed in claim 1, wherein the bearing holder has, on an inner circumferential surface thereof, an inner circumferential groove formed along a circumference,
    wherein the bearing holder has an insertion groove formed on a part of the outer circumferential surface, and
    wherein in the inner circumferential groove, the elastic ring is positioned, and in the insertion groove, the elastic support is provided.

3. The reducer of the electric power steering apparatus as claimed in claim 1, wherein the supporting member is made of a plastic material having an amount of moisture-absorption expansion lower than or equal to that of a plastic material used for the worm wheel.

4. The reducer of the electric power steering apparatus as claimed in claim 3, wherein the supporting member is made of one or more materials selected from the group including mono cast (MC) nylon, polyamide 6, polyamide 66, polyamide 46, and polyamide 12.

5. The reducer of the electric power steering apparatus as claimed in claim 1, wherein the supporting member is formed in an arc shape in which an inner circumferential surface of the supporting member is supported by the outer circumferential surface of the bearing holder, and an outer circumferential surface of the supporting member is supported by the inner circumferential surface of the gear housing.

6. The reducer of the electric power steering apparatus as claimed in claim 1, wherein the supporting member is formed in a circular shape, in which a radial width of a portion supported by the outer circumferential surface of the bearing holder is larger than that of a different portion supported by the outer circumferential surface of the bearing holder.

7. The reducer of the electric power steering apparatus as claimed in claim 1, wherein the supporting member is formed with a projection at a lateral surface thereof, and the projection is inserted in a fixing groove formed in the gear housing.

8. A reducer of an electric power steering apparatus, the reducer comprising:
    a worm shaft bearing supporting an end of a worm shaft opposite to a motor shaft coupling portion end of the worm shaft, the worm shaft being formed with a worm tooth-engaged with a worm wheel;
    a bearing holder coupled with the worm shaft bearing while wrapping an outer wheel of the worm shaft bearing;
    a first elastic support and a second elastic support intervened between the worm shaft bearing and the bearing holder, which are oppositely positioned;
    a third elastic support provided on an inner circumferential surface of a gear housing so as to support an end portion of the worm shaft; and
    a supporting member positioned between an outer circumferential surface of the bearing holder and the inner circumferential surface of the gear housing so as to support the end portion of the worm shaft.

9. The reducer of the electric power steering apparatus as claimed in claim 8, wherein the bearing holder has a first insertion groove formed on a part of an inner circumferential surface thereof and a second insertion groove formed on a different part of the inner circumferential surface, in which the first elastic support and the second elastic support are provided respectively, and
    wherein the bearing holder has a third insertion groove formed on a part of the outer circumferential surface in which the third elastic support is provided.

10. The reducer of the electric power steering apparatus as claimed in claim 8, wherein the supporting member is made of a plastic material having an amount of moisture-absorption expansion lower than or equal to that of a plastic material used for the worm wheel.

11. The reducer of the electric power steering apparatus as claimed in claim 10, wherein the supporting member is made of one or more materials selected from the group including mono cast (MC) nylon, polyamide 6, polyamide 66, polyamide 46, and polyamide 12.

12. The reducer of the electric power steering apparatus as claimed in claim 8, wherein the supporting member is formed in an arc shape in which an inner circumferential surface of the supporting member is supported by the outer circumferential surface of the bearing holder, and an outer circumferential surface of the supporting member is supported by the inner circumferential surface of the gear housing.

13. The reducer of the electric power steering apparatus as claimed in claim 8, wherein the supporting member is formed in a circular shape, in which a radial width of a portion supported by the outer circumferential surface of the bearing holder is larger than that of a different portion supported by the outer circumferential surface of the bearing holder.

14. The reducer of the electric power steering apparatus as claimed in claim 8, wherein the supporting member is formed with a projection at a lateral surface thereof, and the projection is inserted in a fixing groove formed in the gear housing.

15. A reducer of an electric power steering apparatus, the reducer comprising:
- a worm shaft bearing supporting an end of a worm shaft opposite to a motor shaft coupling portion end of the worm shaft, the worm shaft being formed with a worm tooth-engaged with a worm wheel;
- a bearing holder coupled with the worm shaft bearing while wrapping an outer wheel of the worm shaft bearing;
- an elastic support provided on an inner circumferential surface of a gear housing so as to support an end portion of the worm shaft; and
- a supporting member positioned between an outer circumferential surface of the bearing holder and the inner circumferential surface of the gear housing so as to support the end portion of the worm shaft,
- wherein the supporting member is made of a plastic material having an amount of moisture-absorption expansion lower than or equal to that of a plastic material used for the worm wheel.

* * * * *